United States Patent [19]
Ito et al.

[11] Patent Number: 5,345,354
[45] Date of Patent: Sep. 6, 1994

[54] MAGNETIC READ/WRITE HEAD HAVING A REDUCED THICKNESS CLOSURE CORE

[75] Inventors: Tomio Ito; Hideyuki Miyazaki, both of Kofu; Hideyuki Moriya; Kazuhito Wakabayashi, both of Yamanashi, all of Japan

[73] Assignee: TDK Corporation, Tokyo, Japan

[21] Appl. No.: 45,109

[22] Filed: Apr. 12, 1993

Related U.S. Application Data

[62] Division of Ser. No. 720,699, Jun. 25, 1991, Pat. No. 5,229,904, which is a division of Ser. No. 487,304, Mar. 2, 1990, Pat. No. 5,057,957.

[30] Foreign Application Priority Data

Mar. 3, 1989 [JP] Japan ................ 1-51500
May 5, 1989 [JP] Japan ................ 1-127257

[51] Int. Cl.$^5$ .............. G11B 5/17; G11B 5/265; G11B 5/187
[52] U.S. Cl. .................. 360/121; 360/119; 360/122; 360/125
[58] Field of Search ............. 360/119, 121–123, 360/125

[56] References Cited

U.S. PATENT DOCUMENTS

| | | | |
|---|---|---|---|
| 4,387,410 | 6/1983 | Takanohashi et al. | 360/119 X |
| 4,787,002 | 11/1988 | Isozaki | 360/123 X |
| 5,057,957 | 10/1991 | Ito et al. | 360/122 X |
| 5,229,904 | 7/1993 | Ito et al. | 360/121 |

FOREIGN PATENT DOCUMENTS

| | | | |
|---|---|---|---|
| 52-35616 | 3/1977 | Japan | 360/119 |
| 58-171710 | 10/1983 | Japan | 360/119 |
| 62-162211 | 7/1987 | Japan | 360/119 |
| 63-117358 | 5/1988 | Japan | 360/119 |

*Primary Examiner*—John H. Wolff
*Attorney, Agent, or Firm*—Oblon, Spivak, McClelland, Maier & Neustadt

[57] ABSTRACT

This invention relates to a wide-write/narrow-read head having a pair of C-shaped cores one of which is used as a read core and the other of which is used as a write core, and a closure core which is provided between the two cores to shut off side magnetic circuits at the time of data reading. The closure is reduced in thickness at the tip end and is shaped to slope toward the read head so as to increase magnetic resistance from said closure core to said read core in order to prevent the magnetic flux extending between said write core and said closure core from leaking into said read core from said closure core.

2 Claims, 8 Drawing Sheets

MAGNETIC READ/WRITE HEAD HAVING A REDUCED THICKNESS CLOSURE CORE

This is a division of application Ser. No. 07/720,699, filed on Jun. 25, 1991, now U.S. Pat. No. 5,229,904, which is a divisional of Ser. No. 07/487,304, filed on Mar. 2, 1990, now U.S. Pat. No. 5,057,957.

BACKGROUND OF THE INVENTION

The present invention relates to a magnetic head which writes in or reads out data in or from a magnetic recording medium, and more particularly to a wide-write/ narrow-read head which is often used for a magnetic card system or an input/output section of a computer, and to a recording/reproducing method therefor.

As this type of data recording/reproducing heads, there has been known a head comprising a combination of plural cores so that the magnetic gap for writing-in and the magnetic gap for reading-out are placed one upon the other or adjacent to each other. For instance, there has been known a wide-write/narrow-read head which has a write core, a read core and a closure core arranged in a manner so that the width of the write-in track comprising write-in (recording) magnetic gaps is larger than the width of the read-out (reproducing) magnetic gap track, and the read-out track exists within the write-in track. Such a conventional wide-write/narrow-read head is shown in FIG. 10A. A closure core 3 which is substantially formed as a letter I is sandwiched between two opposing cores 1 and 2 of the letter C shape. The closure core 3 is recessed to form a dent 3a in the shape of U at the center end thereof, and the first C-shaped core (read core) 1 is projected 1a at the center tip thereof so that the projection 1a of the read core 1 is inserted into the dent 3a of the closure core 3. The projection 1a is opposed to the tip end 2a of the second C-shaped core (write core) 2. This portion is used as a central magnetic gap (read gap) 4 while the portion where the tip end 2a of the core 2 is opposed to the closure core 3 is used as side magnetic gaps or closure gaps 5, 5. Read-out winding 6 is coiled on said read core 1 and write-in winding 7 on said write core 2. A central magnetic circuit A is defined to extend on the central portions of the read core 1 and the write core 2 as shown by solid-line-and-arrows while side magnetic circuits B are defined to pass between the write core 2 and the closure core 3 as shown by broken-line-and-arrows in the figure. Data are written in over the whole width W of the central magnetic gap 4 as well as the closure gaps 5, 5 on both sides thereof by the electric current of the write core 2. For reading out of the data, the narrower width W' of only the central magnetic gap 4 of the read core 1 is used. (Refer to FIG. 11.)

As shown in FIGS. 12A and 12B, in the prior art digital recording magnetic head of this type, the closure core 3 is not recessed so deeply to form the dent portion 3a at the front end of the core 3 in order to maintain a certain strength thereon, but is recessed in the depth only sufficient to receive the projection 1a at the center tip of the read core 1. The core width of the closure core front end opposite to the write cores on both sides of the recess 3a or, in other words the thickness T of the core in the direction of the traveling magnetic medium remains as thick as or almost similar to the length of the projection 1a of the read core 1. (Refer to FIG. 10B.)

This type of magnetic head generally writes in data in so-called "saturation recording". As magnetic circuits A and B are generated in plurality as a whole head core, and further the circuit B is divided at the front end portion of the closure core to the circuits $B_1$ and $B_2$ ($B = B_1 + B_2$), as shown in FIG. 10B, crosstalk will occur in the circuit A because of the influence from the side magnetic circuits B when the data is being read out. Especially in the aforementioned type, as the recess 3a formed at the front end of the closure cores 3 has a depth only sufficient to receive the projection 1a of the read core 1 as shown in FIGS. 10A, 10B, and as the read core 1 and the closure core 3 are proximal to each other in position, the side magnetic circuits B between the write core 2 and the closure core 3 come closer to the central magnetic circuit A extending from the write core 2 to the read core 1 at the front end projection thereof, increasing crosstalks on the circuit A from the closure gaps 5, 5 through said recess 3a of the closure core 3 and deteriorating the read characteristics.

SUMMARY OF THE INVENTION

This invention accordingly aims at providing a magnetic head which can reduce crosstalks at the time of reading by preventing magnetic flux from entering the read core side from the closure gaps and providing a data recording/reproducing method by means of said magnetic head which does not cause crosstalks.

Another object of this invention is to provide a magnetic head which can reduce crosstalks (especially on the side of reading) from the closure gaps by reducing the area where the closure cores and the read core are arranged in proximity without lowering the strength on the closure core so as to improve read-out characteristics.

Still another object of this invention is to provide a digital head which can be written in at the same saturation intensity level across the whole width of the write-in track.

This invention provides a magnetic head of the type wherein a closure core formed with a recessed portion at the front center end thereof is held between a first C-shaped core having a projection at the center tip end thereof and a second C-shaped core so that the projection of the first C-shaped core can be inserted into the recessed portion of the closure core, magnetic gaps are formed respectively between said closure core and said second C-shaped core and between said central projection of said first C-shaped core and said second C-shaped core, and said first and second C-shaped cores are wound with windings respectively, which is characterized in that said closure core is provided with a means which eliminates side magnetic flux passing through said closure core and said second C-shaped core or shorten the magnetic path length thereof to thereby reduce the number of magnetic lines of flux passing from said closure core to said first C-shaped core.

This invention also provides an data recording/reproducing method which records/reproduces data by a magnetic head comprising a first C-shaped core having a projection at the front tip thereof, a closure core having a recessed portion at the front end thereof, the projection on the first C-shaped core being inserted into the recessed portion of the closure core, and a second C-shaped core an end of which said closure core and said first C-shaped core are joined via magnetic gaps, designating said first C-shaped core as a read core and said second C-shaped core as a write core; the method is characterized in that said closure core is provided with a short coil or a short ring, an ON/OFF switch is connected to said short coil or short ring, and said ON/OFF switch is turned OFF at the time of data recording and turned ON at the time of reproducing.

DESCRIPTION OF THE PREFERRED EMBODIMENTS

This invention will now be described by referring to preferred embodiments shown in attached drawings.

Figure 1:
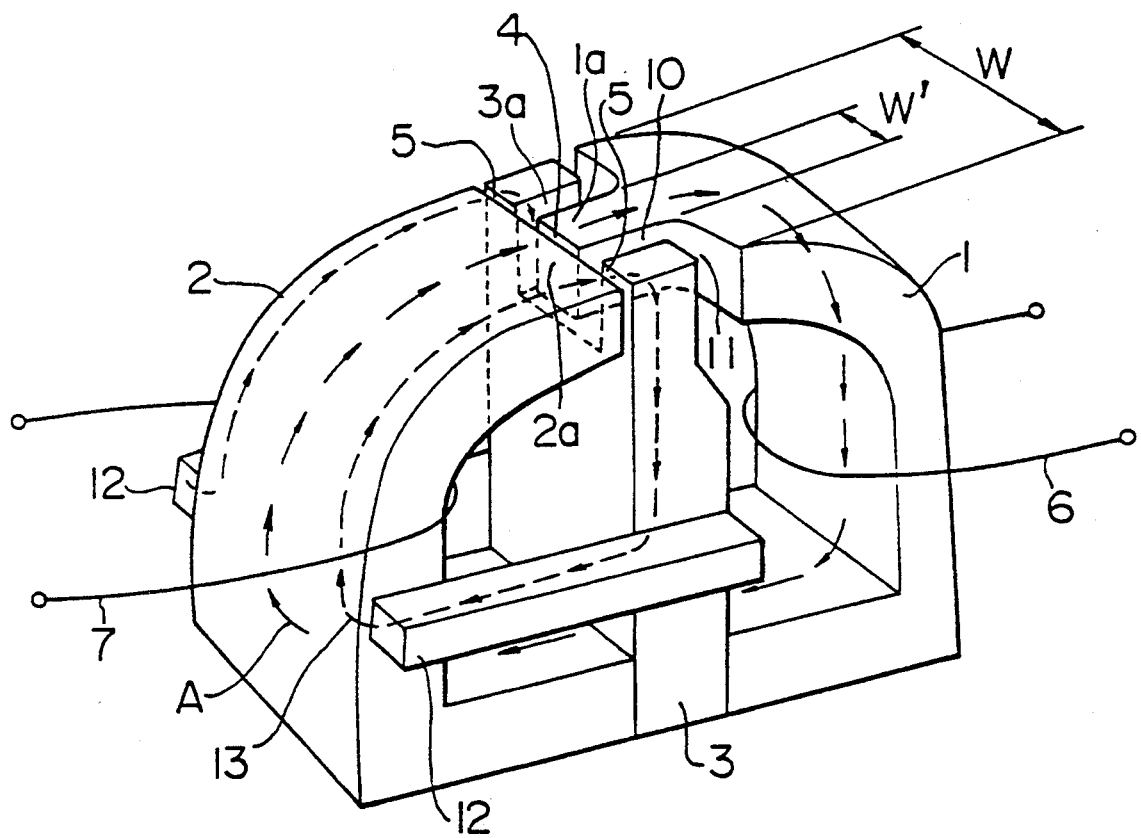
FIG. 1 is a perspective view to show an embodiment of the digital head according to this invention.
Figure 10A:
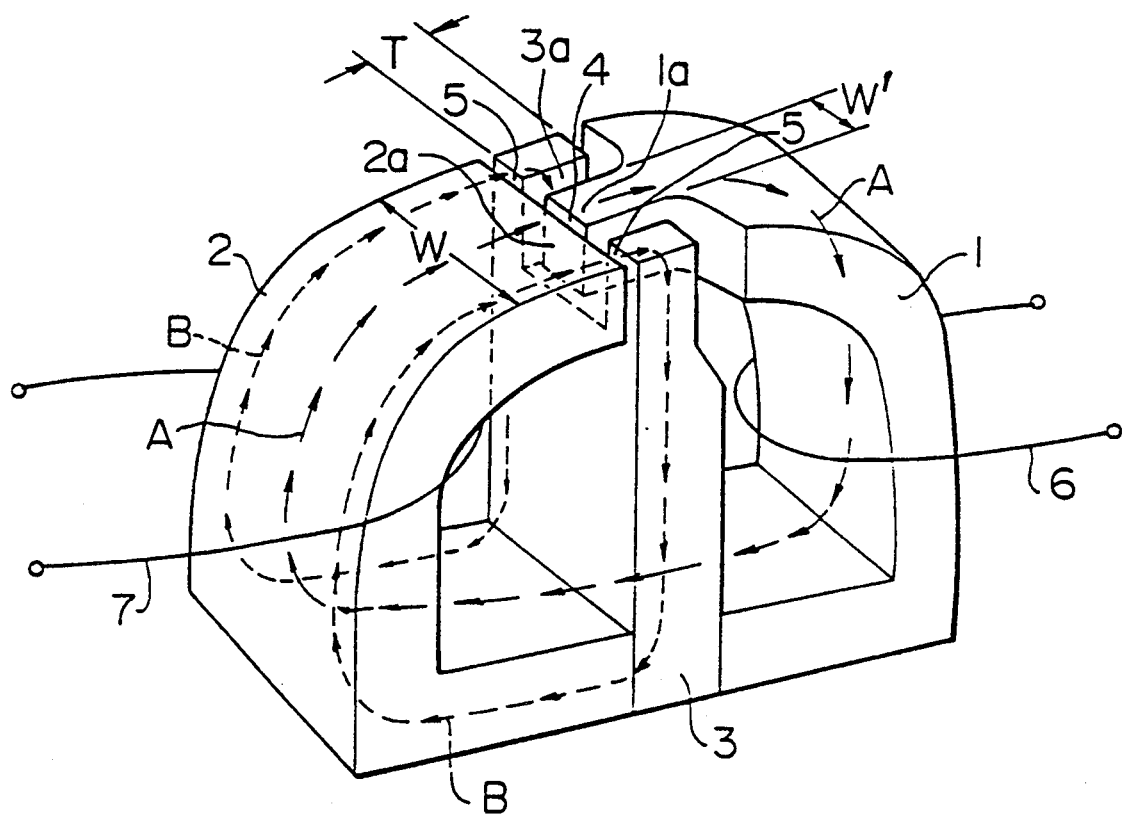
FIG. 10A is a perspective view to show a wide-write/narrow-read head of the prior art and FIG. 10B is a view to show center and side magnetic circuits at the front end portion of the closure core in a prior art head.
Figure 10B:
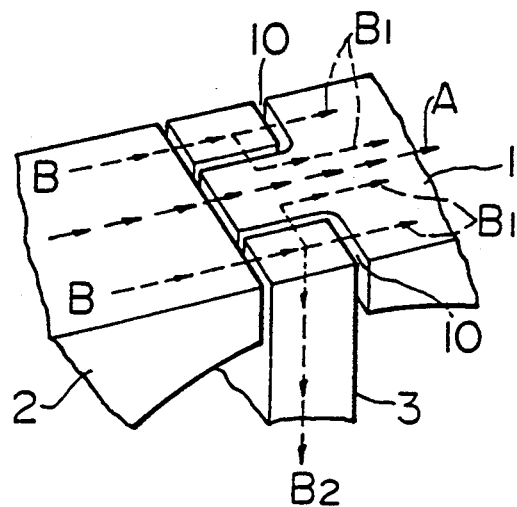
Figure 11:
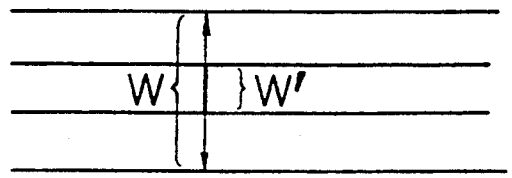
FIG. 11 is a view to show a write-in/read-out track of the prior art digital head.
Figure 12A:
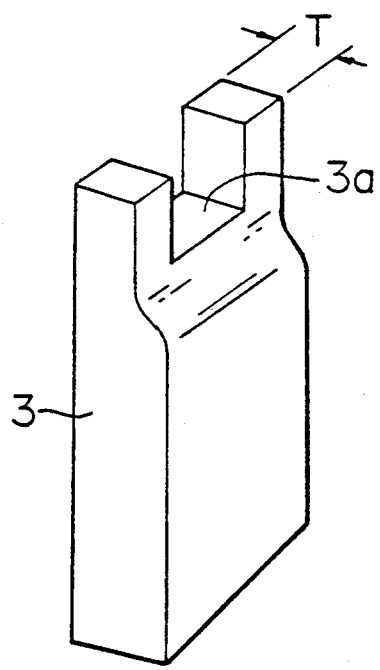
FIGS. 12A and 12B are respectively a perspective view and a frontal view to show the closure core of the magnetic head shown in FIG. 10A.
Figure 12B:
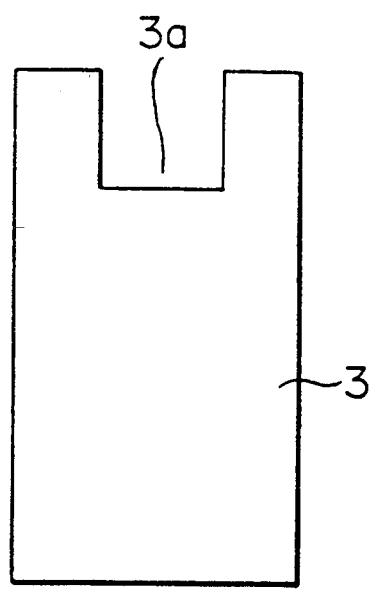

Referring to FIG. 1, a magnetic head comprises a closure core 3 and a first and a second C-shaped cores 1, 2 arranged on both sides of the core 3. Similar to the structure of the prior art shown in FIG. 10A, the whole width of the core (or the width W in the direction perpendicular to the traveling direction of the magnetic medium) is used as a write-in track in which a read-out track of a narrower width W' is formed. As described in relation to FIG. 10A, the closure core 3 is bored at the center of an end thereof penetratingly in the traveling direction of the magnetic medium to form a recessed portion 3a, and a projection 1a is formed at the center (on the side to contact the magnetic medium) of the first C-shaped core 1 so that the projection may be received within the recess. When the second C-shaped core 2 contacts the closure core 3, magnetic gaps 4, 5 are formed respectively between the projection 1a of the first C-shaped core 1 and the second C-shaped core and between the closure core 3 and the second C-shaped core on both sides of the first gap. The clearances 10, 11 formed between the closure core 3 and the first C-shaped core 1 in the traveling direction of the magnetic medium and the direction perpendicular thereto are far greater than the magnetic gaps 4, 5 and fused glass or the like is filled in the clearance for fixation.

In the embodiment shown in FIG. 1, a pair of short circuit cores 12 are fixed on both sides of these cores 2, 3 so that they may associate the second C-shaped core 2 with the closure core 3 at the middle position of the longitudinal direction of the closure core 3. The magnetic circuits generated by electric current passing through the winding 7 for write-in in the above embodiment include not only the magnetic circuit A passing through the center of the width of the core indicated by the solid-line-and-arrows but also short circuits 13 on both sides thereof which pass through the closure core 3 and said short circuit cores 12 indicated by the broken-line-and-arrows. Each of the short circuit magnetic circuits 13 has a magnetic path which is shorter than the conventional side magnetic circuit B shown in FIG. 10A as the path passes through the short circuit core 12. Therefore, the intensity of the magnetic flux thereon increases in counter-proportion to the magnetic path length to increase the write-in strength of the magnetic gaps 5, 5 on both sides to the same strength as the flux of the magnetic gap 4 at the center which has a high intensity. This makes all saturated magnetic characteristics identical across the track width.

Figure 2:
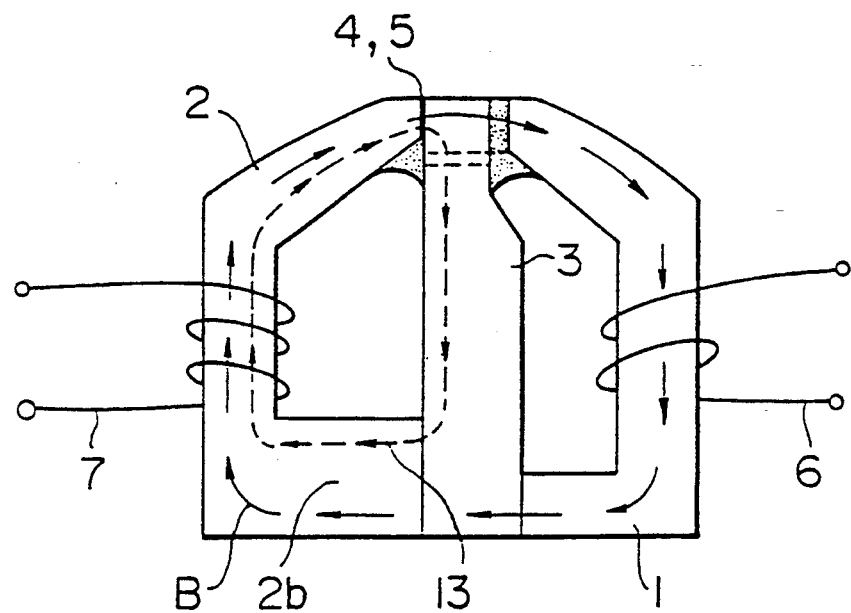
FIG. 2 is a side view to show another embodiment of this invention.

In the embodiment shown in FIG. 2, only the rear portion 2b of the second C-shaped core 2 is integrally formed to have an increased thickness toward the tip end instead of fixing separate short circuit cores on the sides of the C-shaped and the closure cores as above. The closure core 3 is attached on the rear end thereof to the end wall of the rear portion 2b of a greater thickness. As the magnetic circuit 13 between the second C-shaped core 2 and the closure core 3 passes close to the inner side of the C-shaped core rear end 2b, the magnetic path becomes shorter than the side magnetic circuits B in the prior art shown in FIG. 10A, and hence write-in intensity increases due to the magnetic gaps 5 on both sides to thereby make the saturated characteristics identical to each other across the whole width of the track. The short circuit core in the embodiment shown in FIG. 2 comprises a thick rear portion 2b of the second C-shaped core 2.

Figure 3:
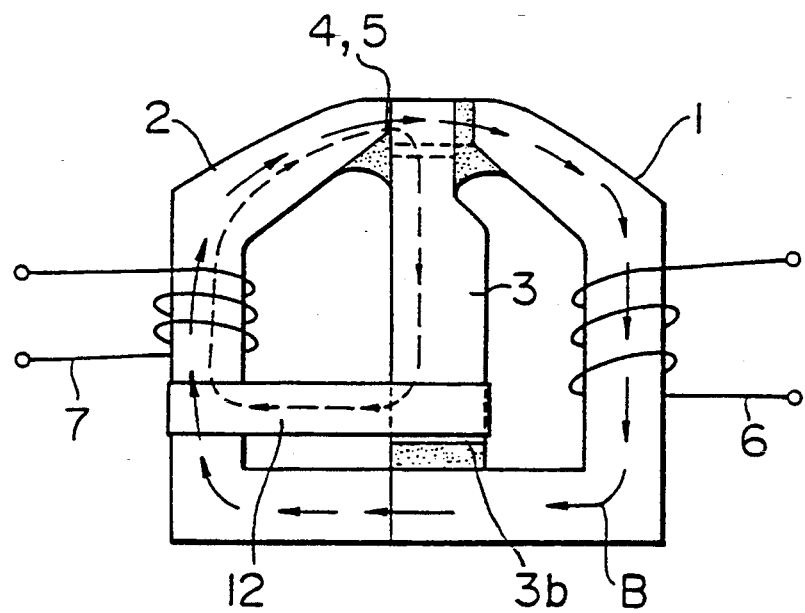
FIG. 3 is a side view to show a modification of the embodiment shown in FIG. 1.
Figure 4:
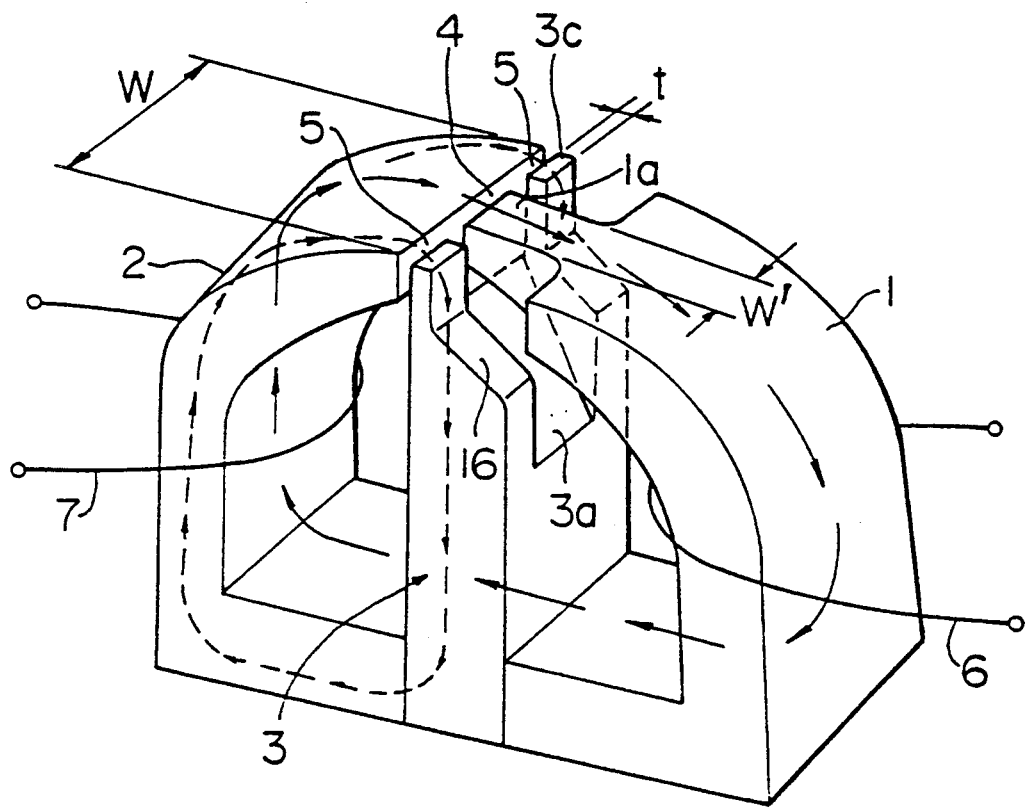
FIG. 4 is a perspective view to show another embodiment of the magnetic head according to this invention.
Figure 5:
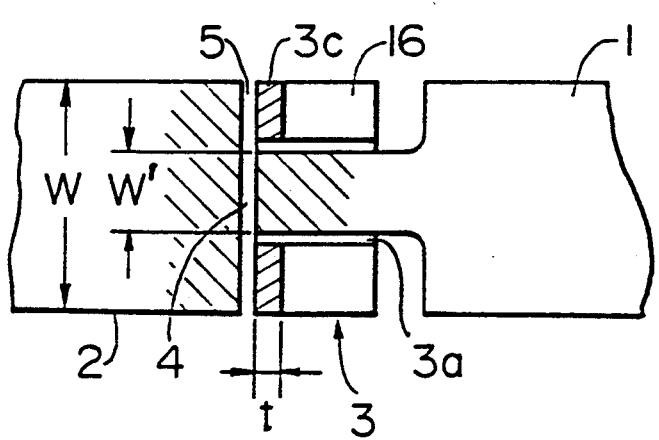
FIG. 5 is a plane view of the embodiment shown in FIG. 4 to partially show the head's front face.

FIG. 3 shows a modification of the embodiment shown in FIG. 1 wherein short circuit cores 12 are fixed between the second C-shaped core 2 and the closure core 3, and the rear end 3b of the closure core 3 is magnetically separated from the rear portions of the C-shaped cores 1 and 2. This arrangement causes the magnetic flux passing through the closure core 3 to flow through the second C-shaped core 2 via the short circuit core 12 rather than to the rear portions of the C-shaped cores 1, 2 to thereby further increase the write-in intensity on the portion from that of the one shown in FIG. 1.

Embodiments are described referring to FIGS. 4 through 7. A projection 1a on the front end of a C-shaped read core 1 is inserted in the central recess 3a on the front end (contacting side with the magnetic medium) of the closure core 3 which generally has a form of a letter I, and they are assembled in the above joined form into the front end of a C-shaped write-core 2 via the magnetic gaps 4 and 5, 5, to thereby provide a write-track of a wider width W and a read-track of a narrower width W' similarly to the embodiment shown in FIG. 10A. It is obvious by comparison of FIG. 4 with FIG. 10A that the closure core 3 and the read core 1 are proximal to each other in an area less than in the conventional one in this embodiment. The projection 1a of the read core 1 comes closer to the core 3 only in the vicinity of the end tip of the projection 1a of the core 1.

Figure 6:
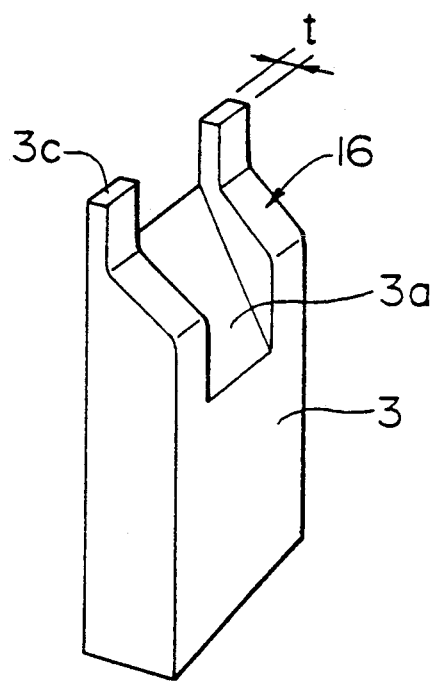
FIG. 6 is a perspective view to show a closure core of the magnetic head shown in FIG. 4.

In an embodiment shown in FIG. 6, the closure core 3 is cut off on the shoulders thereof on the side facing the read core 1 or the side opposite to the magnetic gaps 5, 5 as indicated by the reference numeral 16 to thereby decrease the thickness t of the front portions 3c adjacent to the write core ends in the traveling direction. The recessed portion 3a at the center front of the closure core 3 is cut off on the bottom thereof to form a slope inclining toward the read core 1. When the thickness of the closure core 3 is decreased on the front end 3c thereof, if the depth at the center recess 3c becomes excessive, the strength at the core front becomes insufficient and prone to breakage in the manufacture process. This lowers the yield. In this embodiment, however, as the bottom of the recess 3a is cut out to form a slope toward the read core 1 or the opposite side of the write core 2, it would achieve the same effect as the deeper recess without decreasing the strength of the closure core 3 at the front end thereof. For example, when the thickness t of the front end of a closure core 3 is made $50\mu$, sufficient strength is maintained due to the sloped structure and at the same time it can separate the recess 3a away from the front end of the read core 1 by a greater distance to thereby prevent the magnetic flux passing between the write core 2 and the closure core 3 from entering the side of the read core 1 and reduce crosstalks. The magnetic resistance of the closure core 3 would not be lowered.

Figure 7:
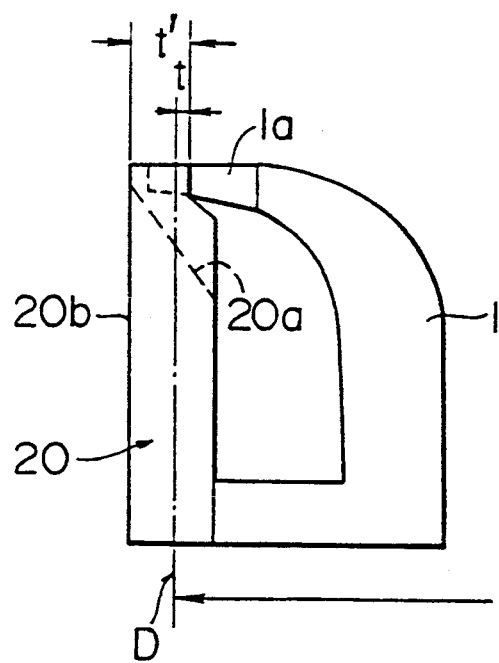
FIG. 7 is a side view to show a state of the closure core in the process of manufacture.

When such a closure core with a thin front end is manufactured, a closure core material 20 is formed in advance to have a large thickness (t') and a sloped recess 20a as shown in FIG. 7. Then, the shaped material 20 is attached and fixed on a read core 1 and cut on the outer side surface 20b of the material 20 to the position D as viewed from the side of the read core 1. As the clearance between the read core 1 and the front end of the closure core material 20 is filled with resin or the like and fixed, the front end of the cores would not be damaged when the material 20 is being cut on the outer surface thereof so that a core of a desirable thickness t is easily obtained.

Description will now be given to the embodiments shown in FIGS. 8 and 9. In the embodiments, a C-shaped read core 1 and a write core 2 are arranged on both sides of a closure core 3 shaped like the letter I shape. The whole width of the core is used as a write-in track W in which a read-out (the width perpendicular to the traveling direction of the medium) track of a narrower width W' is formed similarly to the conventional one shown in FIG. 10A. As described in relation to FIG. 10A, a recess 3a is formed at the center tip of the closure core 3 penetratingly in the traveling direction of the magnetic medium, and a central projection 1a is formed at the tip end of the read core 1 to be inserted into the recess 3a. When the write core 2 is attached to the closure core 3, a magnetic gap 4 for reading and magnetic gaps (closure gaps) 5, 5 are formed respectively between the projection 1a of the read core and the center of the write core 2 and between the write core 2 and the closure core 3 on both sides. Fused glass is filled and fixed in the clearances 10, 11 between the read core 1 and the closure core 3 adjacent to the magnetic gaps.

Figure 8:
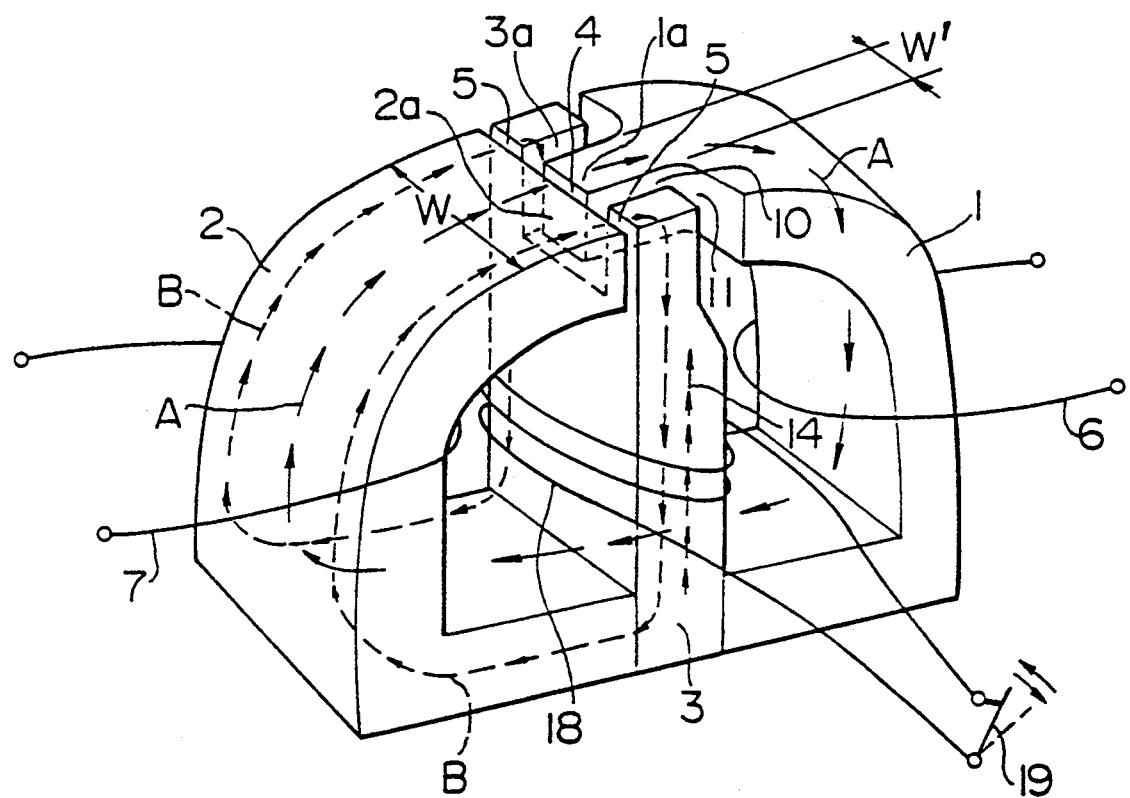
FIG. 8 is a perspective view to show still another embodiment of the magnetic head according to this invention.

In the embodiment shown in FIG. 8, a coil 18 is wound on the closure core 3 at the middle portion thereof and lead wires of the coil 18 are connected to an ON/OFF switch 19. When the switch 19 is turned ON, a counter-electromotive force is generated on the coil 18 due to the magnetic circuits B passing through the closure core 3, and the counterelectromotive force in turn generates magnetic flux lines 14 which offset the magnetic flux of said circuits B. The coil 18 in this case functions as a short coil. No effect is caused when the switch 19 is turned OFF. At the time of writing, the switch 19 of the coil 18 is turned OFF, data writing is controlled by the writing winding 7 over the whole track width of the central magnetic gap 4 and the closure gaps 5, 5 while at the time of reading, the switch 19 of the coil 18 is turned ON to control the reading winding 6. As described above, when the coil switch is turned ON, the function of the closure core 3 is offset, and the side magnetic flux passing between the write core 2 and the closure core 3 is cancelled to reduce the crosstalk in reading out.

Figure 9:
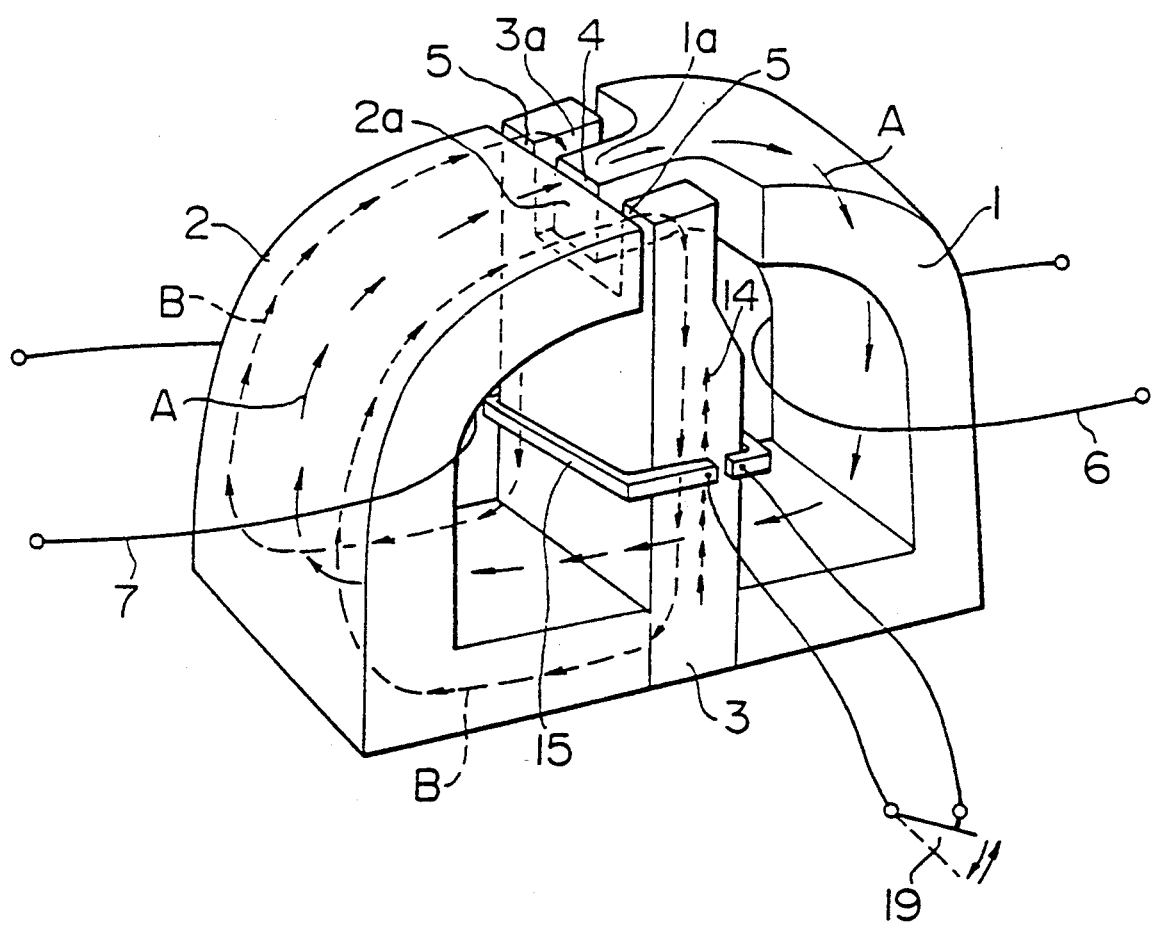
FIG. 9 is a perspective view to show still another embodiment of this invention.

In FIG. 9 another embodiment of this invention is shown wherein a partially interrupted ring 15 is provided on a closure core 3, and an ON/OFF switch is connected to the ring via lead wires. At the time of writing, the switch 19 is turned OFF while at the time of reading data out, it is turned ON similarily to the embodiment shown in FIG. 8.

As described above, this embodiment can reduce the effect of the closure core at the time of reproduction to thereby remarkably decrease crosstalks simply by attaching a short coil or a short ring on the closure core and switching the short coil or the short ring ON or OFF for reproduction or recording.

The remarkable effect of the invention can be achieved simply by attaching a short coil to a conventional structure of a magnetic head as the read core, and the write core and the closure core thereof are not necessary to be made anew. Manufacture of the product is advantageously easy.

What is claimed is:

1. A magnetic head comprising a closure core having a recessed portion at the center tip end thereof, a first and second C-shaped core provided on both sides of said closure core, said first C-shaped core having a projection at the center tip end thereof in a manner to be inserted into said recessed portion, magnetic gaps formed respectively between said closure core and said second C-shaped core and between said projection of said first C-shaped core tip end and second C-shaped core, and a first coil and a second coil wound on said first and second C-shaped cores respectively, wherein the magnetic head is further provided with an electrical short circuit of said closure core including an ON/OFF switch to selectively close said short circuit.

2. A data recording/reproducing method by means of a magnetic head comprising a closure having a recessed portion at the center tip end thereof, a first and a second C-shaped core provided on both sides of said closure core, said first C-shaped core having a projection at the center tip end thereof in a manner to be inserted into said recessed portion, magnetic gaps formed respectively between said closure core and said second C-shaped core and between said projection of said first C-shaped core tip end and said second C-shaped core, a first coil and a second coil wound on said first and second C-shaped cores respectively, an electrical short circuit of said closure core, including an ON/OFF switch for selectively closing said short circuit, wherein said first C-shaped core and said first coil are used as a read core and a read coil while said second C-shaped core and second coil are used as a write core and a write coil, and said ON/OFF switch is turned off at the time of recording data while said switch is turned on at the time of reproducing the data.

* * * * *